United States Patent [19]

Holdensgaard et al.

[11] Patent Number: 5,359,834
[45] Date of Patent: Nov. 1, 1994

[54] CONVEYOR SYSTEM WITH VARIABLE SPACING BETWEEN THE CARRIER UNITS

[75] Inventors: Preben H. Holdensgaard, Marslet, Denmark; Lloyd M. Spencer, Sr., Albion, Mich.

[73] Assignee: O.G. Høyer A/S, Hojbjerg, Denmark

[21] Appl. No.: 969,319

[22] PCT Filed: Jun. 19, 1992

[86] PCT No.: PCT/DK92/00195
§ 371 Date: Feb. 18, 1993
§ 102(e) Date: Feb. 18, 1993

[87] PCT Pub. No.: WO92/22486
PCT Pub. Date: Dec. 23, 1992

[30] Foreign Application Priority Data
Jun. 10, 1991 [DK] Denmark ............... 1185/91

[51] Int. Cl.⁵ .............. B65B 39/14; B65B 5/04; B65G 15/00
[52] U.S. Cl. ............. 53/566; 53/251; 53/252; 198/465.1; 198/577; 198/579
[58] Field of Search ............ 53/250, 251, 252, 566; 198/465.1, 465.3, 467.1, 577, 579

[56] References Cited

U.S. PATENT DOCUMENTS

| | | | |
|---|---|---|---|
| 4,526,564 | 7/1985 | Hughes | 53/252 X |
| 4,578,927 | 4/1986 | Scarpa et al. | 53/252 X |
| 4,607,477 | 8/1986 | Hinchcliffe et al. | 53/252 X |
| 4,615,274 | 10/1986 | Hoehn | 198/465.1 X |
| 4,676,362 | 6/1987 | Malzkorn | 198/465.1 |
| 4,717,013 | 1/1988 | Reissmann et al. | 198/579 X |
| 4,768,641 | 9/1988 | Hibi et al. | 53/252 X |
| 5,092,450 | 3/1992 | Schommartz et al. | 198/579 X |
| 5,175,976 | 1/1993 | Petry et al. | 53/252 |

*Primary Examiner*—Horace M. Culver
*Attorney, Agent, or Firm*—Antonelli, Terry, Stout & Kraus

[57] ABSTRACT

A cartonizing machine wherein articles are arranged either individually or in groups in trays passing through a feeding station and to and through a loading station wherein the articles on the successive trays are pushed transversely into respective carton members conveyed with a mutual spacing. The filling of the trays is facilitated when the trays are closely juxtaposed with such being achieved by a tray conveyor system disposed so as to operate with a reduced tray pitch and a tray speed in the feeding station.

3 Claims, 2 Drawing Sheets

CONVEYOR SYSTEM WITH VARIABLE SPACING BETWEEN THE CARRIER UNITS

FIELD OF THE INVENTION

The present invention relates to a machine for cartionizing articles comprising an endless feeder conveyor operable to successively move a row of carrier trays through a filling station, in which the carrier trays are manually or automatically filled with articles to be packed, and then through a loading station, in which the articles are automatically pushed from the trays into erected carton members, whereafter the emptied trays are returned by the feeder conveyor to the filling station. The loading station forms a portion of a carton handling line comprising a magazine for prepared flat carton members and a station for erecting the flat carton members into a rectangular tubular shape before the carton members are supplied to the loading station, while, after the loading station, further stationing are provided for gluing and closing the carton. The transfer of the articles from the carrier trays to the cartons may make place during a standstill or during synchronized co-motion of the carrier trays and the cartons.

BACKGROUND OF THE INVENTION:

It is desirable that such a cartonizer be adjustable to the effect that the cartonizer can handle different sizes of cartons and articles, for example, such that during one period of time large size units can be handled, followed by a period of handling small size units. Here the carton line sets a certain dimensioning limit, namely, with respect to a distance between the consecutive units. The carton line can be designed to handle carton members of a given maximum width, and it is then possible to use the carton line also for handling carton members of smaller widths, but what cannot be changed is the pitch of the carton line. The units themselves may be narrower than those having a maximum width, but the distance between their centers or, for that matter, between their front or rear ends will have to be the same as for units of the maximum width. It will be very complicated and expensive to make the carton line adaptable in this respect.

Particularly in connection with cartonizers designed for dynamic transfer of the articles into the carton members that is, during co-motion of the trays and the cartons, it is necessary to make use of the exact pitch as far as the trays on the feeding conveyor are concerned, such that, in the loading station, a tray can be aligned with a carton member almost before or immediately after the article on the preceding tray is laterally transferred into its associated carton member.

Conventionally, this has given rise to serious problems. It is no problem to provide the feeding conveyor with the article trays having a relevant width for the articles to be packed, as this will only be a question of replacing one set of trays with another set of broader or narrower trays, but for trays narrower than the maximum width, there will occur a certain spacing between the edges of the consecutive trays, and such spacing is highly inconvenient for a safe operation of the feeding station. In the feeding station, it is imperative that the articles can be placed neatly in the trays with a minimum of attention and, particularly, in connection with manual filling of the trays, it may well happen that the operator places an article in a tray not fully or not all centered therein, whereafter it should be relatively easy to correct the positioning of the article by a simply push on the article. When the trays are of the maximum width, the tray edges will be closely juxtaposed, for example, one tray will be followed practically immediately by another tray, and the operator can easily secure a correct positioning of the articles on the trays. This becomes more difficult when narrower trays with a mutual distance are used, and, from practical experience, there are many examples of operators having filled articles down into the open spaces between two consecutive trays resulting in sever operational disturbances. On this background, it is a common practice that the empty spaces between trays, narrower than the maximum width, are held covered by plate elements located in the top level of the trays, such that the operator can not loose any article, but rather easily scrape a misplaced article into the relevant tray. However, these added plate elements exhibit some problems of their own, mainly, with respect to the costs of their presence and with respect to their driving through the entire conveyor system.

SUMMARY OF THE PRESENT INVENTION

According to the present invention, the feeding conveyor is arranged so as to allow for a close juxtaposition of the consecutive trays during the passage of the trays through the filling station, such that the connecting plate elements between relatively narrow trays can be entirely avoided, while care is still taken that the trays are spaced as required when passing through the loading station. At the loading station is it important whether or not the trays are interconnected by such plate elements once the articles have been orderly placed in the trays.

The invention calls for three main functions of the feeding conveyor, namely, stowing the relatively narrow trays closely together in the filling station, expanding the distance between the trays as the trays are moved through the loading or transferring station for loading the articles into the carton members, and moving the emptied trays as quick as possible back to the filling station in a sufficient number to ensure a steady presence of a desired number of stowed trays in the filling station.

It will be understood that, in normal continuous operation, there will be the same number of trays per unit of time passing through any cross section of the conveying path, namely, given by the operational speed of the carton handling line. In the filling station, the closely juxtaposed trays will thus exhibit the additional advantage of being moved relatively slowly, such that the attendants can place the articles in the trays with still further ease.

In accordance with the present invention, an ordinary conveyor chain is employed for expanding the distance between the trays as they are moved through the loading station for loading the articles into the carton members and for moving the empty trays as fast as possible back to the filling station in a sufficient number to ensure a steady presence of the desired number of stowed trays, that is, a conveyor is equipped to carry the tray units at a pitch at a center distance as given by the carton handling line, for example, typically some fifteen (15) inches, while, in the filling station, means are provided for releasing the tray units from their engagement with the chain and transferring units to another driving system in which the tray units are conveyed slowly and closely to each other and from which the tray units are consecutively delivered back to their engagement with the chain conveyor so as to be brought through the loading station with the reduced center distance and speed. Alternatively, the tray units can maintain their engagement with the chain conveyor even when passing through the filling station namely, if care is taken to reduce the distance between the tray carrying chain portions, leaving the chain slack or bulging out in the spaces therebetween.

In accordance with further features of the invention, a number of different conveyors may be used for forming the closed conveying path of the tray units. In such a system, it is possible to control the center distance between the tray units by accelerating and decelerating the units between the stations in which the center distance should be the same, large or small. This will require a good deal of control equipment, but it will largely facilitate the mechanical handling means and provide for an extreme operational flexibility. The conveyor bringing the tray units from the rear end of the loading station back to the entrance of the filling station may operate at a high speed, for example, with a very long distance between the trays, and, accordingly, the total number of tray units in the entire system can be reduced. This is particularly relevant where it is desirable to make use of a high number of trays operatively present in the filling station. Even with the use of the first mentioned chained conveyor, it will be possible to arrange for a quick return of the tray units to the filling station, as also in the return run the tray units may be released from the chain and transferred to a separate return conveyor for renewed engagement with the chain conveyor when the tray units leave the filling station.

No matter how the control system is devised, when it is required to switch to another carton and article width, it will, still be necessary to replace the tray units with others correspondingly dimensioned tray units, regardless of the pitch or center distance in the loading station having to be unchanged. In the mechanically controlled system, this will imply a corresponding replacement or adjustment of the conveyor means bringing the trays through the filling station such that also the new trays can be brought closely together in this station, while in the sensor controlled plural conveyor system no such replacement will be required, as merely an adjustment of the control settings will be sufficient.

BRIEF DESCRIPTION OF THE DRAWINGS

In the following description, the invention is explained in more detail with reference to the drawings, wherein.

DETAILED DESCRIPTION

Figure 1:
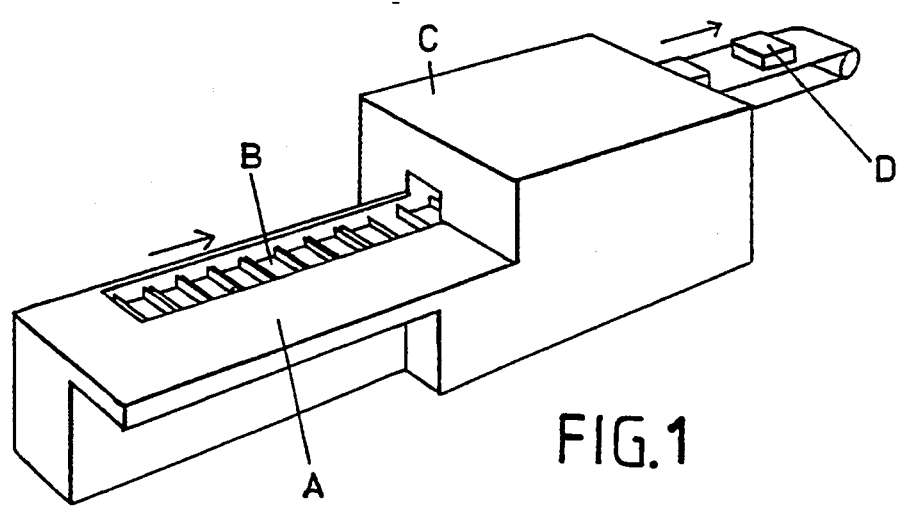
FIG. 1 is a perspective view of a cartonizer according to the present invention.

The cartonizing apparatus shown in FIG. 1 comprises a table portion A, on which articles to be cartonized in groups can be received, and a row of trays B for receiving the articles in such groups, arranged by an operator of the table portion A. The trays are conveyed into the cartonizer section C, in which the article groups are placed in cartons D which leave the cartonizer on, for example, a conveyor belt.

The system shown in FIG. 1 comprises a driving endless chain conveyor 2 and, for example, two chain conveyors may be arranged side by side, with the chain conveyor 2 having outwardly protruding pins 4 for driving a row of tray conveyors 6 along a rail system 7 defining a path of movement of the tray carriers 6, and with each of the protruding pins 4 carrying a tray 8. A spacing P between the tray carriers 6 is determined by requirements set by a co-acting carton handling line 10 in the cartonizer C.

Figure 2:
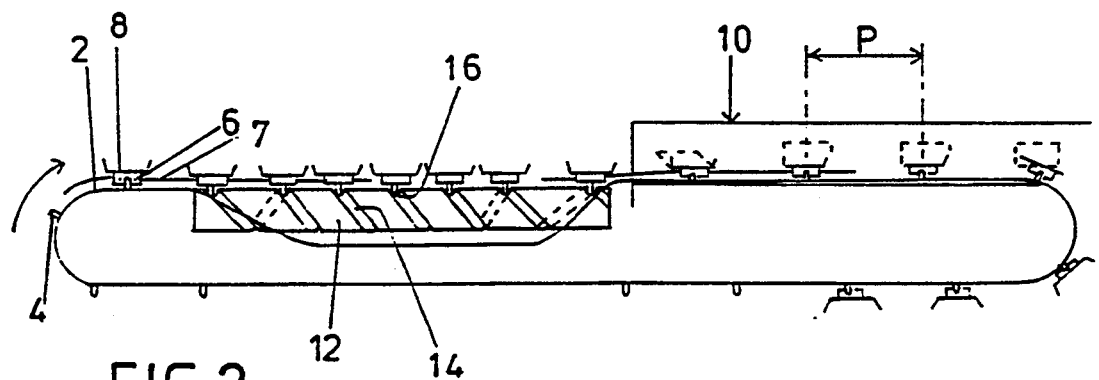
FIG. 2 is a schematical side view of a tray system according to the invention.

As shown in the left hand portion of FIG. 2, the conveying of the trays 8 is accomplished by a substantially horizontally disposed conveyor worm 12 provided with a screw or threaded groove 14 adapted to receive a downwardly projecting pin 16 on the tray carriers 6. The conveyor chains 2 are guided so as to bypass the conveyor worm 12 out of engagement with the tray carriers 6, and the guiding rails 7 are arranged such that the guiding rails 7 will guide the tray carriers 6 directly into engagement with the left hand end of the screw or threaded groove 14 and thereafter still stabilize the tray carriers 6 during following forced movement of the tray carriers 6 along the rotating conveyor worm 12. Inversely, when leaving the right hand end of the conveyor worm 12, the tray carriers 6 will again be engaged by the pins 4 of the driving conveyor chains 2 and the pins 4 will remain thus engaged and held by the guiding rail 7 until the respective pins 4 return to the conveyor worm 12 through the lower run of the chain conveyor 2.

The screw or threaded groove 14 of the conveyor worm 12 has a rather high pitch at both ends thereof, while along a middle portion thereof, the pitch is considerably smaller. Consequently, as illustrated, the trays 8 will be brought together almost so as to touch each other, for example, the narrower pitch of the conveyor worm 12 is adapted according to the width of the trays 8. If the system is rearranged with wider trays it may be required, therefore, to even replace the conveyor worm 12.

The area along which the trays 8 are closely juxtaposed will be the filling area of the supply conveyor B, where articles can be placed in the trays 8 in a safe and convenient manner partly because the trays 8 are located directly side by side and partly because the trays 8 will move relatively slowly through the filling station.

Figure 3:
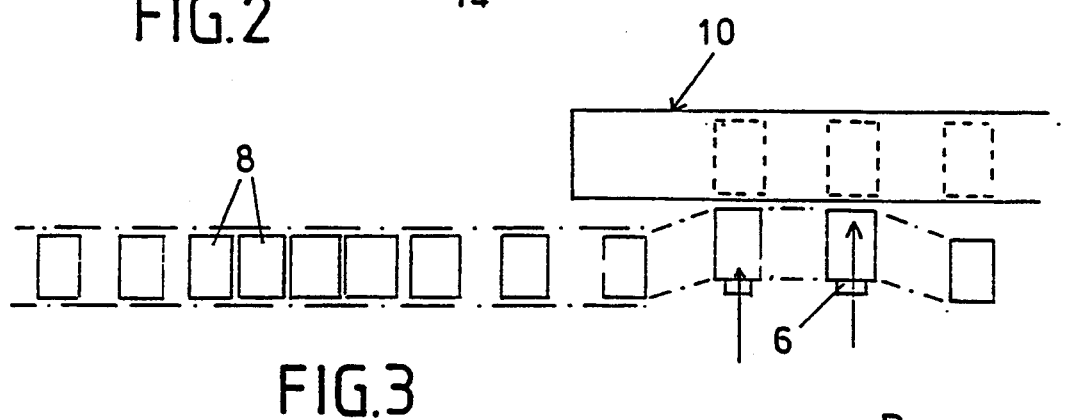
FIG. 3 is a corresponding top view thereof.

As shown by the arrows in FIG. 3, when the trays 8 pass along the carton handling line 10, the articles on the trays 8 will be laterally discharged off the trays 8 and into the carton members; the lateral discharge arrangement may be constructed in a conventional manner and, consequently, will not be further described herein. It is also illustrated that the trays 8 are also displaced laterally on the tray conveyors 6 in order to get close to the carton members, but also this is well known in the art and, of course, the tray carriers should only be designed correspondingly.

The trays 8 may well be divided into two or more compartments for plural article packaging. According to a special feature of the invention, there may be arranged, between the filling area and the loading area, a station comprising means for automatically pushing a single article into a tray compartment, should an empty compartment be detected.

Figure 4:
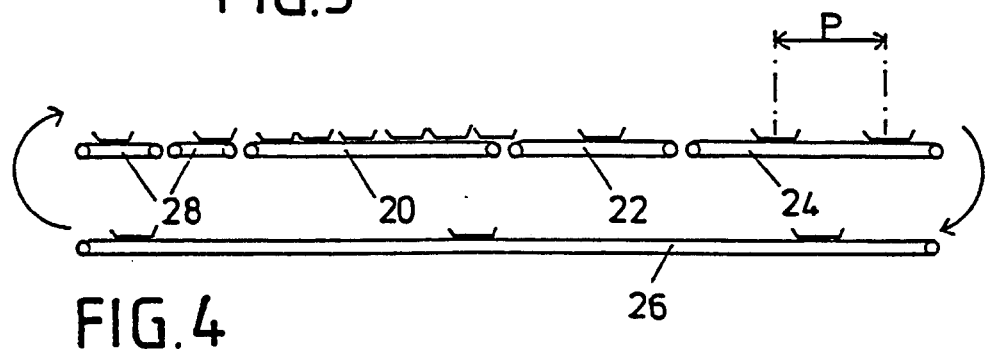
FIG. 4 is a schematic side view of a modified system.

FIG. 4 illustrates a slowly moving conveyor 20 extending along the filling area and followed by a controlled acceleration conveyor 22 delivering trays 8 to a conveyor 24, with the conveyor 24 being adapted to move the trays through the loading station at the prescribed tray pitch P. A separate return conveyor 26 operates at a fast speed for returning the trays 8 with a pronounced widened pitch such that there will not be many trays running idly in the return run. From the return conveyor 26, the trays 8 are transferred to one or more controlled decelerating conveyors 28, from which the trays 8 are delivered to the filling conveyor 20.

It will be appreciated that, in a system based on the use of controlled intermediate conveyors between the filling conveyor and the loading conveyor, it will be possible to replace the trays 8 with broader or narrower trays 8 as required without replacing the conveyors, as the remaining adaptation will be a question of resetting the control parameters.

Figure 5:
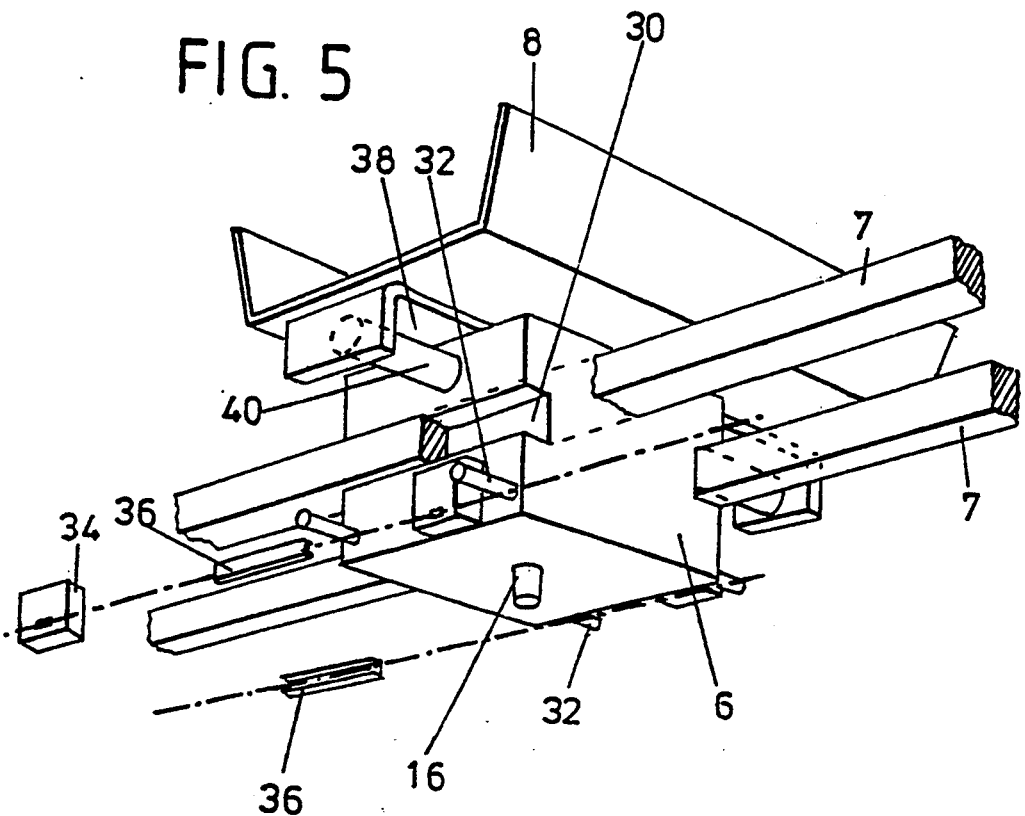
FIG. 5 is a perspective view of a single tray carrier, as viewed from below.
Figure 6:
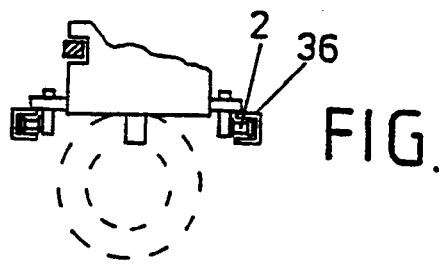
FIG. 6 is an end view thereof.

As shown in FIG. 5, the tray carrier 6 includes a block member which is provided with lateral grooves 30 for cooperation with the guiding rail system 7, as well as with laterally protruding pin members 32 adapted to receive upstanding dog members 34 on the chain conveyor 2 such that each tray carrier can be driven along the guiding rails 7. The chain conveyors 2, see also FIG. 6, are guided in fixed C-shaped rails 36, which, at the beginning and end of the conveyor worm 12, are curved so as to bring the dogs 32 out of an into driving engagement with the tray carrier 6 as these, by way of the lower pins 16 respectively engage and disengage the worm groove 14.

The trays 8 are mounted on a support 38 which is laterally displaceable on the carrier 6, guided by a rod 40, whereby the trays 8 can carry out the lateral movements discussed hereinabove in connection with FIG. 3.

Figure 7:
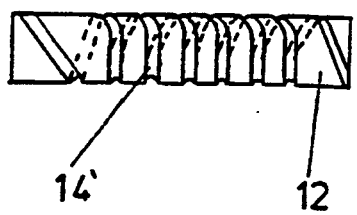
FIG. 7 is a side or top view of a modified driving element with reference to FIG. 1.

The worm groove 14 should not necessarily impart a continuous motion to the trays 8. For example, as shown in FIG. 7, the worm groove designated 14' may be arranged so as to extend, by each turn, in a circular manner over a part of the circumference of the worm, whereby the closely juxtaposed trays 8 will be moved in a stepwise manner.

We claim:

1. A machine for cartonizing articles, the machine comprising a filling station in which articles to be cartonized are supplied to carrier units, a carton erecting station in which cartons are successively prepared for receiving the articles, a transfer station in which the articles are successively loaded into the cartons from the carrier units while the cartons are advanced at a predetermined mutual spacing, and a conveyor system operable to move the carrier units from the filling station to and through the loading station, wherein in the loading station, the carrier units are advanced successively with a mutual spacing corresponding to that of the cartons, and the conveyor system is adapted to advance the carrier units with a reduced mutual spacing during passage of the carrier units through the filling station.

2. A machine according to claim 1, wherein the conveyor system comprises an endless chain adapted to drive the carrier units through the loading station with the required mutual spacing between the carrier units and returned to an entrance of the filling station, a driving means of the conveyor system in the filling station including a rotating worm having a screw fashioned as one of a driving track or ridge means for cooperation with the carrier units, and wherein said endless chain is adapted to one of bypass the filling station or pass inoperatively through said filling station.

3. A machine for cartonizing articles according to claim 1, wherein the respective article carrying means are closely juxtaposed during passage through the filling station.

* * * * *